(12) United States Patent
Fisher et al.

(10) Patent No.: US 9,912,127 B2
(45) Date of Patent: Mar. 6, 2018

(54) RETRACTING MECHANISM FOR SENSING COMPONENTS IN A SWITCHGEAR CABINET

(71) Applicant: SCHNEIDER ELECTRIC USA, INC., Schaumburg, IL (US)

(72) Inventors: Mark J. Fisher, Murfreesboro, TN (US); Gregory Brent Lee, Murfreesboro, TN (US); Frank M. Page, Murfreesboro, TN (US); Daniel M. O'Neill, Smyrna, TN (US); Kevin M. Bullock, Brentwood, TN (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 15/034,210

(22) PCT Filed: Dec. 5, 2013

(86) PCT No.: PCT/US2013/073238
§ 371 (c)(1),
(2) Date: May 4, 2016

(87) PCT Pub. No.: WO2015/084359
PCT Pub. Date: Jun. 11, 2015

(65) Prior Publication Data
US 2016/0276812 A1    Sep. 22, 2016

(51) Int. Cl.
*H02B 1/36* (2006.01)
*H02B 1/34* (2006.01)
(Continued)

(52) U.S. Cl.
CPC .............. *H02B 1/36* (2013.01); *H02B 1/34* (2013.01); *H02B 1/565* (2013.01); *H02B 3/00* (2013.01); *H02B 13/025* (2013.01)

(58) Field of Classification Search
CPC ........ H02B 1/565; H02B 13/025; H02B 1/36; H02B 1/34
(Continued)

(56) References Cited

U.S. PATENT DOCUMENTS 5,089,934 A   2/1992   Braun et al.
5,358,097 A   10/1994  Bakkila et al.
(Continued)

FOREIGN PATENT DOCUMENTS

EP   1335466     8/2003
FR   2708392     2/1995
JP   H05 300612  11/1993

OTHER PUBLICATIONS

International Search Report and Written Opinion dated Apr. 18, 2014 in PCT/US2013/073238,.
(Continued)

*Primary Examiner* — Dion R Ferguson
*Assistant Examiner* — Mandeep S Buttar
(74) *Attorney, Agent, or Firm* — Locke Lord LLP

(57) ABSTRACT

A switchgear cabinet (100) includes an equipment compartment (102), a bus compartment (104) and a cable compartment (106). The cabinet can employ a sensor(s) (190) to monitor conditions, such as arcing, in the bus or cable compartment. The cabinet also includes a retractable sensor system (150), which has a rack (160) and a slider (170). The rack is mounted in the cabinet, and the slider is configured to retain the sensor. The slider is movably engaged to the rack. The slider can slide in one direction toward a back of the bus or cable compartment to a racked-in position in which the sensor is located to sense arcing in the bus or cable compartment. The slider can slide in an opposite direction
(Continued)

toward a front of the equipment compartment to a racked-out position in which the sensor is drawn into the equipment compartment.

17 Claims, 5 Drawing Sheets

(51) Int. Cl.
    *H02B 13/025*     (2006.01)
    *H02B 1/56*     (2006.01)
    *H02B 3/00*     (2006.01)

(58) Field of Classification Search
    USPC ........................................ 361/678, 600, 690
    See application file for complete search history.

(56) References Cited

U.S. PATENT DOCUMENTS

| | | |
|---|---|---|
| 5,450,280 A | 9/1995 | Wactor |
| 5,689,097 A | 11/1997 | Aufermann et al. |
| 5,805,456 A * | 9/1998 | Higham ............... G07F 17/0092 312/215 |
| 5,933,308 A | 8/1999 | Garzon |
| 6,141,192 A | 10/2000 | Garzon |
| 6,608,741 B1 * | 8/2003 | Macbeth ............... G01R 15/183 324/127 |
| 7,499,251 B2 | 3/2009 | Byron |
| 2010/0328824 A1 | 12/2010 | Roscoe |
| 2011/0110049 A1 | 5/2011 | Lehtola et al. |
| 2011/0216508 A1 | 9/2011 | Faulkner et al. |
| 2011/0299200 A1 | 12/2011 | Yanniello |
| 2016/0156163 A1 * | 6/2016 | Faber ................... H02B 13/025 361/605 |
| 2016/0336730 A1 * | 11/2016 | Kreekon ............... H02H 1/0023 |

OTHER PUBLICATIONS

Extended European Search Report for 13898832.4—1801 / 3078247 PCT/US2013073238 dated Jun. 7, 2017.
Schneider Electric—North American Operating Division Brochure; Document No. 6037HO9901R6/06—Power-Zone 4 Low Voltage Switchgear (Jun. 2006).

* cited by examiner

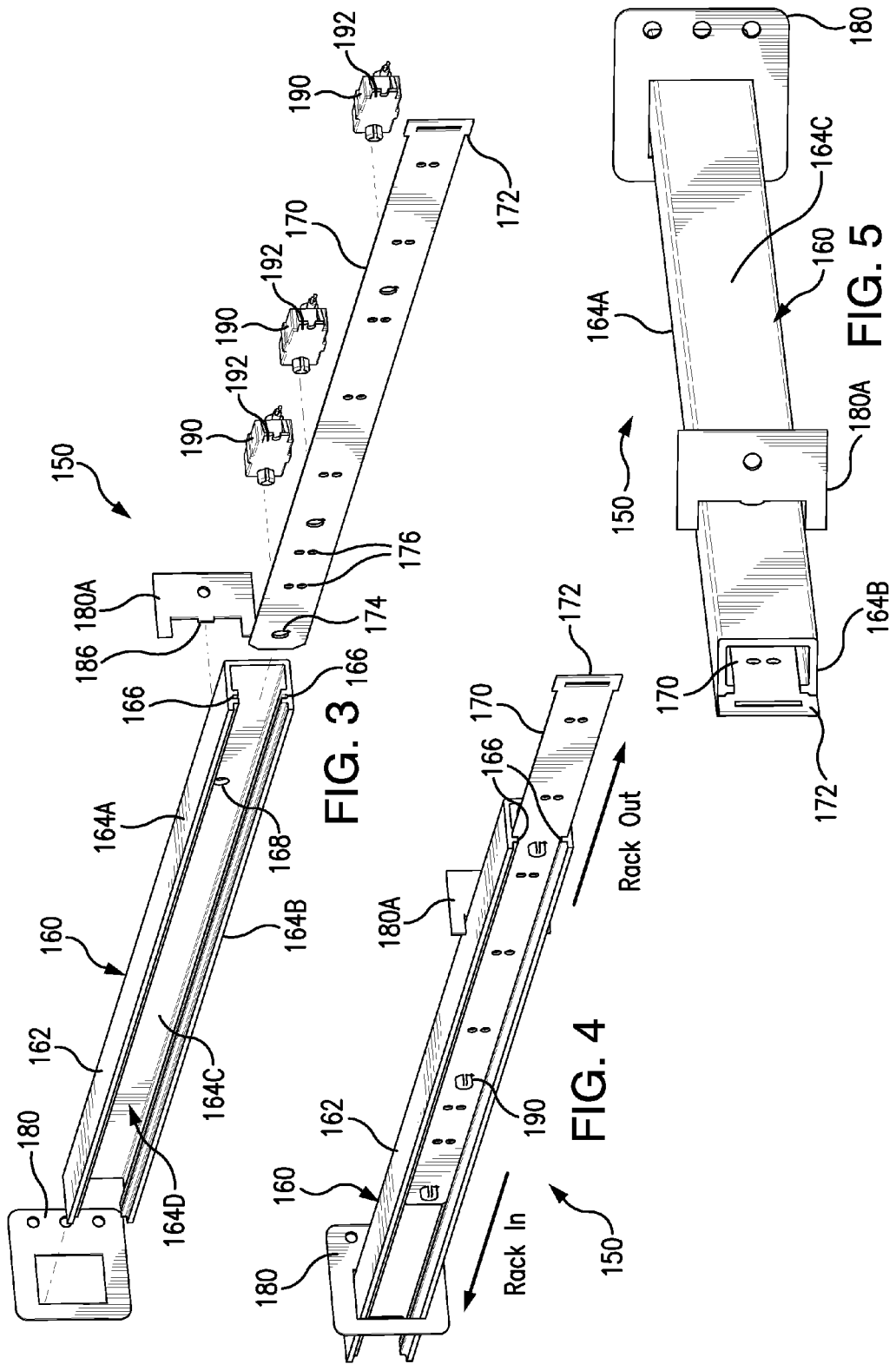

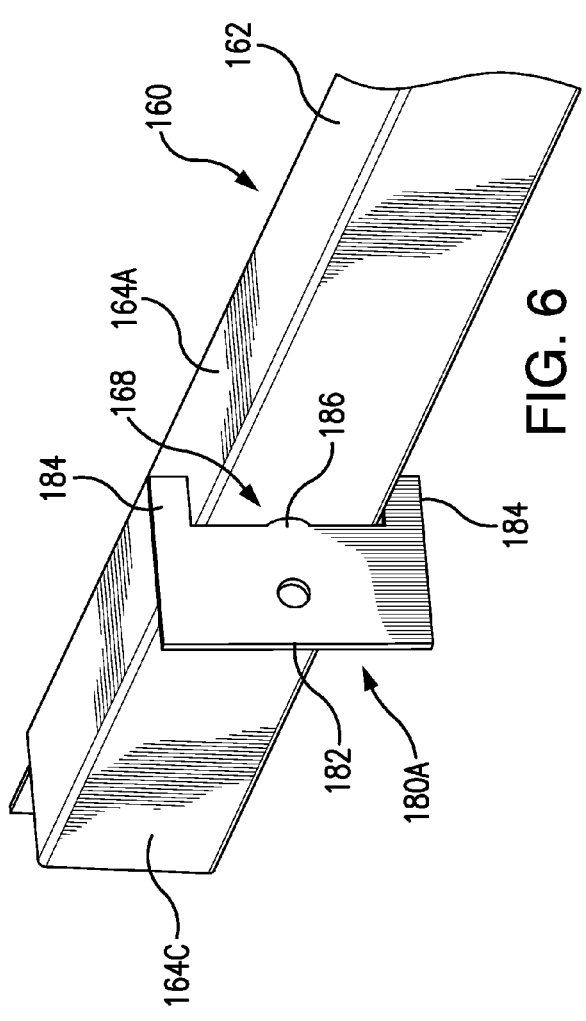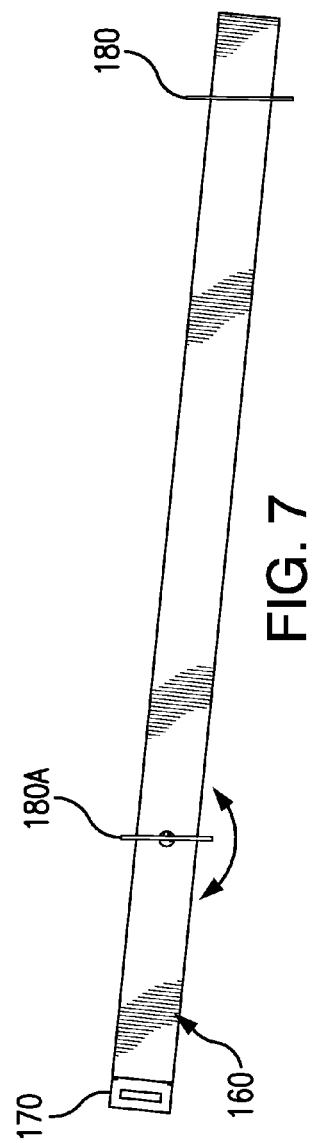

RETRACTING MECHANISM FOR SENSING COMPONENTS IN A SWITCHGEAR CABINET

FIELD

The present disclosure relates to the field of electrical enclosures, and more particularly, to a retractable mechanism to facilitate replacement, inspection or maintenance of sensors or other electrical equipment in a switchgear cabinet.

BACKGROUND

A switchgear cabinet typically includes three compartments: a front equipment compartment, a middle bus compartment and a back cable compartment. The equipment compartment houses switching equipment, such as circuit breakers. The cable compartment houses the fixed power buses. The bus compartment (also referred to as a "wireway") is arranged between the equipment compartment and the cable compartment, and routes power between the equipment and the power buses.

In addition to current overloads, the switchgear cabinet may encounter other hazardous conditions known as arcing faults (or "arc faults"). Arcing faults occur when electric current "arcs" or flows through ionized gas between conductors, e.g., between two ends of broken or damaged conductors, or between a conductor and ground in the switchgear enclosure. Arcing faults can result from corroded, worn or aged wiring or insulation, loose connections and electrical stress caused by repeated overloading, lightning strikes, vermin, dropped wrenches during maintenance, etc. Particularly in medium-to-high voltage power distribution systems, the ionized gas associated with arcing faults may be released at pressures and temperatures sufficient to severely damage or destroy the switchgear equipment and/or cause severe burning injuries or death to operating personnel.

The switchgear cabinet generally provides arc-resistant metal switchgear compartments, often with a means for venting the gases from the compartments in the event of an arcing fault. These compartments are designed to withstand the pressures and temperatures of the gases associated with an arcing fault and reduce the likelihood or extent of damage to switchgear equipment by preventing the gases from entering adjacent switchgear compartments. Safety to operating personnel is enhanced by channeling and venting the hot gases away from operating personnel. However, because these systems do not eliminate the generation and release of hot gases associated with arcing faults, they do not completely eliminate the risk of injury to operating personnel and/or damage to the switchgear equipment.

As a consequence, various arc fault detection systems have been developed to sense an arcing fault, and in response, to quickly interrupt the power supplying the arc. These types of systems incorporate the use of sensors, such as optical sensors, to monitor conditions in the cabinet which may reflect a presence of an arcing fault. The sensors, however, are often located and fixedly mounted in areas of the cabinet, such as the cable and bus compartment, that are not readily accessible for inspection, maintenance or replacement after the equipment is in service. In order to service the sensors, it may be necessary to disassemble equipment or other components of the cabinet, which can result in extended downtime and labor cost.

SUMMARY

To address these and other shortcomings, a switchgear cabinet with an arc fault detection system is provided with a retractable sensor system that allows sensor(s) arranged in areas that are not readily accessible or are inaccessible in the cabinet to be withdrawn and accessed at a user accessible area of the cabinet. An area that is not readily accessible or is inaccessible is one which cannot be reached by a user without having to disassemble equipment or the compartments of the cabinet, such as an area in the bus or cable compartments of the cabinet, after the equipment is in service.

In an exemplary embodiment, the switchgear cabinet can include an equipment compartment, a cable compartment and a bus compartment arranged between the equipment and cable compartments. The switchgear cabinet employs an arc fault detection system with a sensor(s), such as an optical sensor for optically sensing arcing conditions in the bus or cable compartment. The switchgear cabinet also includes a retractable sensor system, which has a rack and a slider. The rack is mounted in the bus compartment, and has one end which extends toward a back end of the equipment compartment and the other end which is arranged in the bus or cable compartment depending on the location of the sensor(s). The slider is configured to retain the optical sensor and, if desired, other sensors. The slider is movably engaged to the rack between a pair of opposing grooves that extend along an open side of the rack. The slider can slide in one direction toward a back of the bus or cable compartment to a racked-in position in which the optical sensor is located to sense arcing in the bus or cable compartment. The slider can also slide in an opposite direction toward a front of the equipment compartment to a racked-out position in which the optical sensor is drawn into the equipment compartment through an access opening at the back of the equipment compartment.

Accordingly, the disclosed retractable sensor system allows electrical components, such as sensors, which are positioned within the bus or cable compartment to be easily withdrawn or extracted from the bus or cable compartment and accessed at a user accessible area in or around the cabinet, such as the equipment compartment. Furthermore, through the use of the disclosed retractable sensor system, it is unnecessary to provide additional wire length to facilitate extraction of electrical components from the bus or cable compartment. The use of tools is also minimized to remove or replace electrical components from the cabinet or to add electrical components to the cabinet.

In further exemplary embodiments, the rack, in combination with the slider, can form an electrical or enclosed conduit, which provides a protective housing for electrical components, such as sensors and their wiring. The slider can be made of a dielectric material, and can be flexible or rigid. The retractable sensor system can be installed in the cabinet at varied orientations, such as horizontally, vertically or at some desired angle, to avoid obstacles, e.g., conductors and other components within the cabinet. For example, the retractable sensor system can include one or more brackets for mounting the rack in the cabinet. The rack can be pivotally engaged to the bracket, which allows the user to manipulate an orientation of the retractable sensor system to avoid obstacles during installation into the cabinet.

In general, the retractable sensor system can be used in any electrical enclosure to allow access to sensors that are positioned to monitor conditions or components at an inaccessible area in an electrical enclosure, such as an interior of bus or cable compartments in a switchgear cabinet. For example, the retractable sensor system can include a rack mountable in the inaccessible area of the electrical enclosure. The retractable sensor system can also include a slider configured to retain a plurality of sensors. The slider is movably engaged to the rack to slide in one direction to a racked-in position in which the sensors are located to sense conditions in the electrical enclosure and to slide in an opposite direction to a racked-out position in which the sensors are drawn into a user accessible area of the enclosure, e.g., the equipment compartment.

BRIEF DESCRIPTION OF THE DRAWINGS

The description of the various exemplary embodiments is explained in conjunction with the appended drawings, in which:

FIG. 3 illustrates an exploded view of the retractable sensor system of FIG. 1.

FIG. 4 illustrates a perspective view of the retractable sensor system of FIG. 1.

FIG. 5 illustrates another perspective view of the retractable sensor system of FIG. 1.

FIGS. 6 and 7 illustrate perspective views of a rack of the retractable sensor system of FIG. 1 pivotally engaged to a bracket of a mounting assembly, in accordance with an embodiment of the present disclosure.

DETAILED DESCRIPTION

Figure 1:
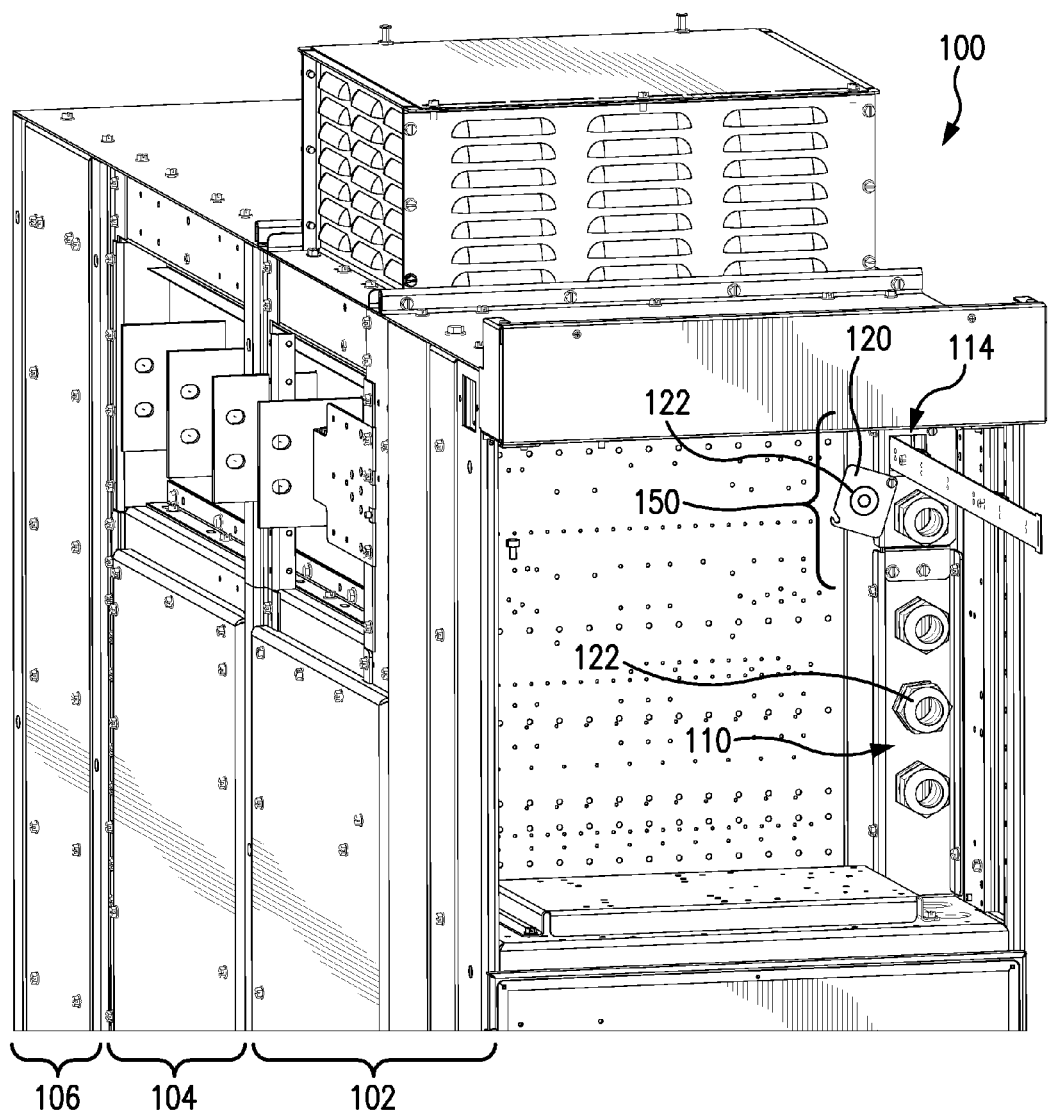
FIG. 1 illustrates a perspective view of an exemplary switchgear cabinet with a retractable sensor system, in accordance with an embodiment of the present disclosure.

In accordance with various disclosed embodiments, there is provided a retractable sensor system for an electrical enclosure, such as a switchgear cabinet. As shown in FIG. 1, an exemplary switchgear cabinet 100 includes an equipment compartment 102, a bus compartment 104 and a cable compartment 106. The equipment compartment 102 includes a grommet panel 110 having a plurality of cable glands 122, and an access panel 120 also having a cable gland 122. The access panel 120 can be removed, as shown, to provide access to a retractable sensor system 150 via an access opening 114. The retractable sensor system 150 allows a user to access, add, remove, replace, inspect, maintain or work on one or more sensors that are used to monitor conditions or components in the bus compartment 104 and/or the cable compartment 106 of the switchgear cabinet 100. In this example, the sensors 190 are optical sensors which are used by an arc fault detection system to identify arcing in the switchgear cabinet 100. However, the sensors 190 can include other types of sensors, such as a thermal sensor, a pressure sensor, a vibration sensor and so forth.

Figure 2:
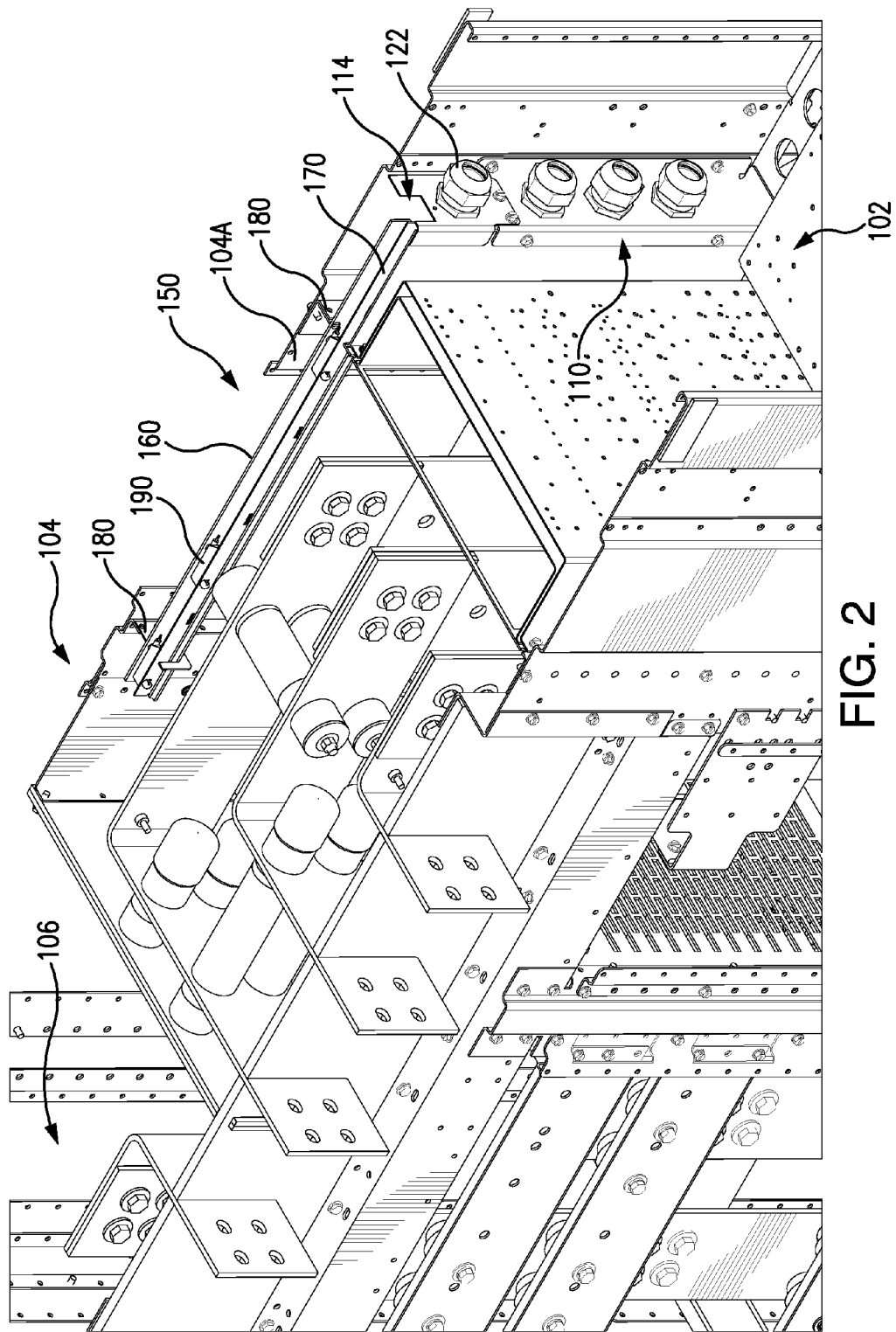
FIG. 2 illustrates a perspective view of an interior of the switchgear cabinet with the retractable sensor system of FIG. 1.

As shown in FIG. 2, the retractable sensor system 150 is mounted via a mounting assembly, such as a plurality of brackets 180, to a surface of at least the bus compartment 104 to retain one or more sensors 190 in the bus compartment 104. Although shown as being mounted adjacent or proximate a side wall 104A of the bus compartment 104, the retractable sensor system 150 can be mounted adjacent or proximate to any surface including a wall of the bus compartment 104 (e.g., to extend along a wall), mounted to a strut of the bus compartment 104 (e.g., a strut at any location in the compartment including the center of the compartment) or cantilevered to a structural member of the bus compartment 104. Although not shown in this example, the retractable sensor system 150 may be extended into and mounted in the cable compartment 106 to retain one or more sensors 190 in the cable compartment 106 as well. The retractable sensor system 150 includes a rack 160 and a slider 170 that retains one or more sensors 190. The slider 170 is movably or slidably engaged on the rack 160. For example, the slider 170 is configured to slide in one direction toward a back of the bus compartment 104 or the cable compartment 106 to a racked-in position in which the sensor 190 is arranged to monitor conditions or components in the bus compartment 104 and, if desired, the cable compartment 106 if the rack 160 is extended into the cable compartment 106. The slider 170 is also configured to slide in an opposite direction toward a front of the equipment compartment 102 to a racked-out position in which the sensor(s) 190 is drawn into the equipment compartment 102, such as shown in FIG. 1. Accordingly, in the racked-out position, a user can add sensors onto the slider 170, remove or replace any of the sensors 190 on the slider 170, or inspect, maintain or work on any of the sensors 190 on the slider 170. Afterwards, the user can rack in the slider 170 to the racked-in position in which the sensors 190 are positioned to monitor conditions or components at desired locations inside the switchgear cabinet 100, and then secure the access panel 120 back onto the equipment compartment 102 to cover the access opening 114.

As shown in FIG. 3, the rack 160 includes a housing 162 having a top wall 164A, a bottom wall 164B, a side wall 164C and an open side 164D opposite the side wall 164C. The rack 160 also includes a pair of opposing grooves 166. One of the opposing grooves 166 is positioned on the top wall 164A and the other of the opposing grooves 166 is positioned on the bottom wall 164B. The pair of opposing grooves 166 extends along a length of the housing 162 of the rack 160.

The slider 170 includes a front end with a handle 172 and a back end opposite the front end. The handle 172 can be used to move the slider to the racked-in or racked-out positions. The slider 170 also includes a plurality of openings 174 and associated slots 176 to mount and retain one or more sensors 190 at different positions or locations along a length of the slider 170. The sensors 190 may include a flexible cantilever or tab 192, which allows the sensors to be snapped into corresponding slots 176. In this example, a sensing portion of the sensor 190 is arranged in the opening 174. Other mounting assemblies can be used to mount and retain a sensor on the slider 170, such as other snap-in assemblies or a bolt-in assembly (e.g., where a portion of the sensor 190 is bolted into a slot or opening on the slider 170).

As shown in FIG. 4, the slider 170 is movably engaged between the opposing grooves 166 of the rack 160 to slide between the racked-in position and the racked-out position. In the racked-in position, the slider 170 closes the open side 164D of the rack 160 so that the rack 160 and the slider 170 together form an electrical or enclosed conduit to provide a protective housing for the bodies of the sensor(s) 190 and the wires of the sensor(s) 190 or any component retained on the slider 170. Furthermore, in this example, the handle 172 is configured with a size and shape to act as a stop against an end of the housing 162 to prevent the handle 172 at the front end of the slider 170 from sliding completely into the housing 162 of the rack 160, when the slider 170 is moved to the racked-in position. Other stop configurations can also be used to define the range of motion of the slider 170 when engaged to move on the rack 160. For example, one or both of the grooves 166 can be configured with a stop (e.g., at a back end of the rack 160) to prevent further movement of the slider 170 when the slider 170 is moved to the racked-in position. The grooves 166 can be configured to terminate at any desired terminal position along the length of the rack 160 to define the racked-in position. The grooves 166 can either be discontinued at the terminal position, or a separate stop piece can be fixed or detachably fixed to the grooves 166 at the terminal position. Furthermore, in another example, an end of the rack 160 can be configured to taper to prevent any further movement beyond the terminal position by the slider 170.

In addition, in this example, the grooves 166 are arranged at a predetermined distance away from the edge of the top wall 164A and the bottom wall 164B. In this way, the sensors 190 retained on the slider 170 are recessed in the rack 160 so that the edges of the top wall 164A and the bottom wall 164B can provide additional protection by keeping other components or parts of the switchgear cabinet 100 away from the sensors 190.

FIG. 5 shows another perspective view of the retractable sensor system 150 in the racked-in position. As previously discussed, the retractable sensor system 150 may be mounted on a surface in the bus compartment 104 and/or cable compartment 106 using brackets, such as brackets 180. The brackets 180 may be formed as part of the switchgear cabinet 100 or connected to a surface of the switchgear cabinet using a bolt-in assembly, a snap-in assembly, a tongue and groove assembly or other fastening mechanism.

One or more of the brackets 180 can be configured so that the rack 160 (or a portion thereof) is pivotally mounted thereon. Thus, the rack 160 or a portion thereof can be engaged to the bracket and then pivotally adjusted to a desired configuration in the compartment(s) of the switchgear cabinet 100, such as to avoid obstacles, e.g., other components or parts, in the switchgear cabinet 100. For example, one of the brackets 180 can be a bracket 180A, which allows a portion of the rack 160 to be pivotally engaged thereon. As shown in FIG. 6, the bracket 180A includes a portion or side 182, which can be connected to a surface of a wall or other structural element (e.g., a strut) in the compartments(s) of the switchgear cabinet 100. The bracket 180A also includes two extending arms 184 and a shaft 186 arranged therebetween (see also FIG. 3). The shaft 186 of the bracket 180A is pivotally engaged in an opening 168 on the side wall 164C of the rack 160. The arms 184 of the bracket 180A provide support for the rack 160 and define a range of pivotal motion for the rack 160 when engaged on the bracket 180A. As shown in FIG. 7, the rack 160 is pivotally engaged to one or more of the brackets 180, which may include one or more brackets 180A. Accordingly, the user is provided with some flexibility to adjust the orientation or position of the rack 160, even after one or more portions of the rack 160 have been mounted on one or more of the brackets 180A in the switchgear cabinet 100. The pivotal range provided through the mounting assembly can be adjusted through the design of the clearance between the arm 184 of the bracket 180A and an adjacent wall of the rack 160, when the rack 160 is mounted onto the shaft 186 of the bracket 180A.

Figure 9:
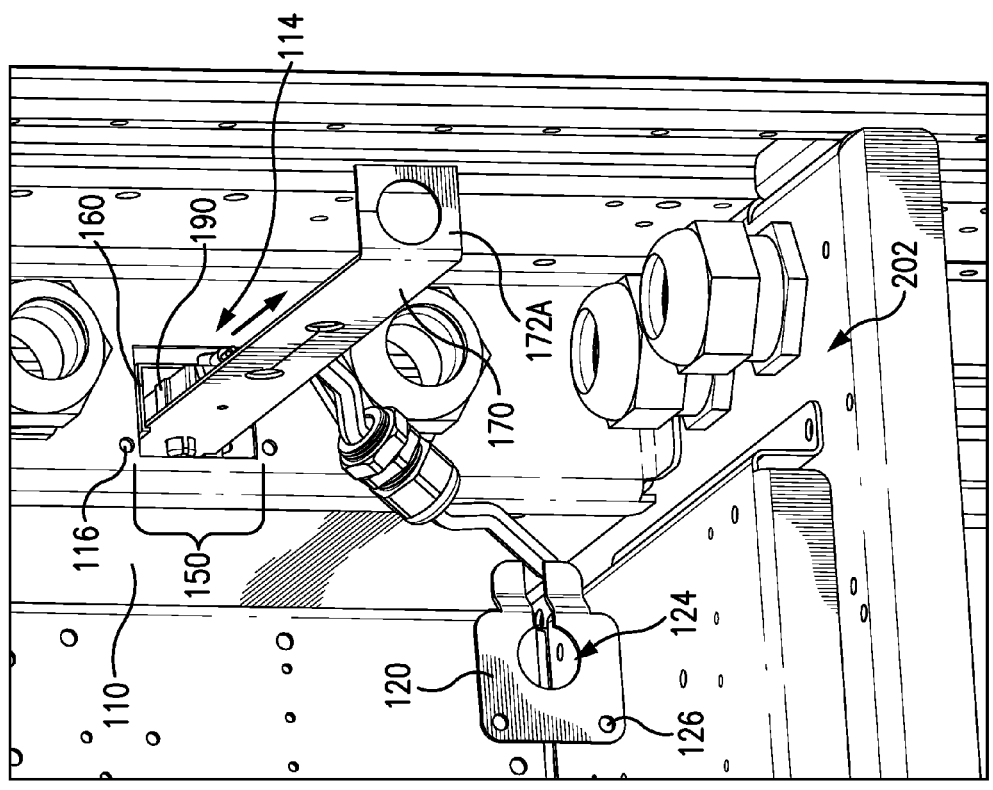
FIGS. 8 and 9 illustrate a partial view of an exemplary switchgear cabinet with a retractable sensor system having a different slider handle, in accordance with another embodiment of the present disclosure.
Figure 8:
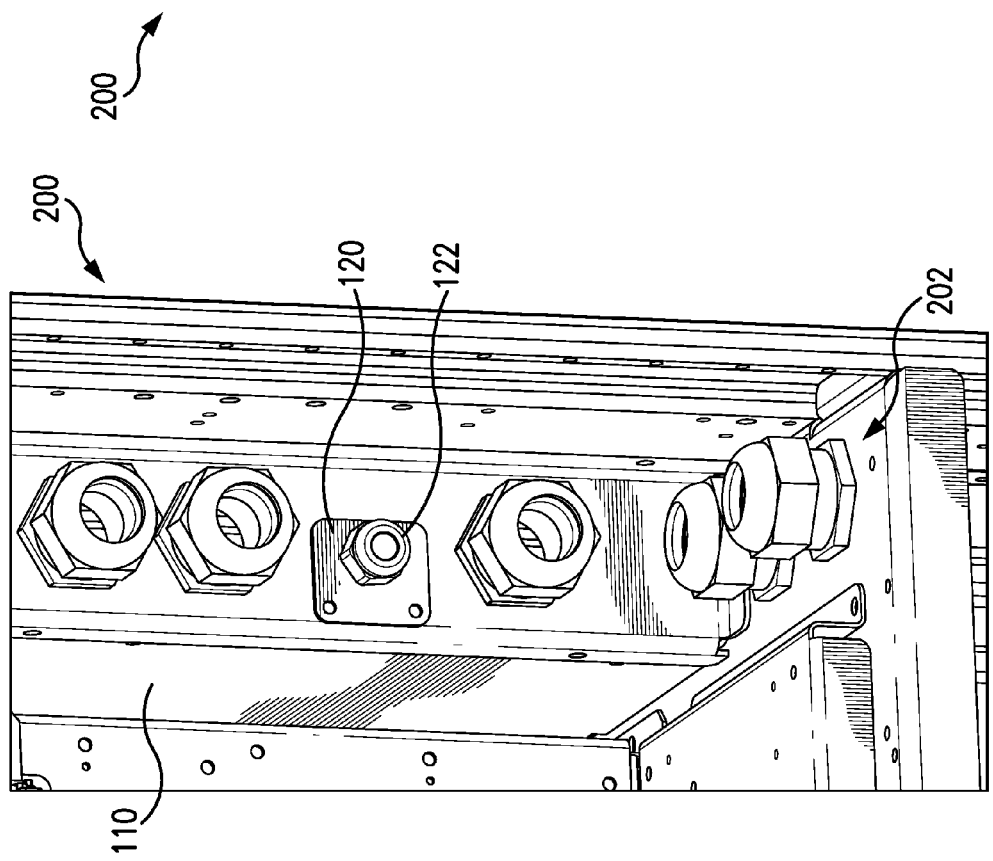

FIGS. 8 and 9 illustrate a partial view of an exemplary switchgear cabinet 200 with a retractable sensor system 150 having a different slider handle 172A, in accordance with another embodiment of the present disclosure. In this example, the access panel 120 and the retractable sensor system 150 are arranged at a different location in the switchgear cabinet than in the example of FIG. 1. For example, the access panel 120 is located at a bottom corner of the equipment compartment 202 to provide access to the retractable sensor system 150. The access panel 120 is configured with a size and shape to cover an access opening 114 on a grommet panel 110 at a back of the equipment compartment 202. The access panel 120 includes an opening 124 for a cable gland 122 and also includes holes 126. In this example, to secure the access panel 120 onto the grommet panel 110, the holes 126 of the access panel 120 are aligned with holes 116 of the grommet panel 110. Thereafter, bolts are screwed through the holes. The access panel 120 may be detachably fastened to cover the opening 124 using other fastening assemblies, such as snap-in assembly, tongue and grooves, and so forth.

The various disclosed embodiments of the retractable sensor system 150 are simply provided as examples. The retractable sensor system 150 may be configured with movable components (e.g., the slider) and stationary components (e.g., the rack) of different sizes, shapes and lengths to operate between a racked-in position and a racked-out position in any electrical cabinet or enclosure that employs one or more sensors. The components of the retractable sensor system 150 can be formed of a dielectric material, plastic, metal or other suitable material depending on the application.

The movable components of the retractable sensor system 150, such as the slider, can be rigid or flexible. For example, the slider can be formed of a flexible material, which allows the slider to retain sensors thereon but at the same time allows the slider to bend and ride along grooves to provide greater flexibility in the design of the rack. In this way, the rack or its grooves do not need run along a straight line (e.g., an L-shaped rack), and can be designed around components or parts in the switchgear cabinet or designed to position sensors non-linearly at desired locations in the switchgear cabinet. Furthermore, the profile shapes of the stationary components (e.g., the rack) and moveable components (e.g., the slider) can be altered without impacting the functionality of the retractable sensor system.

Although the retractable sensor system 150 is shown in various embodiments as being racked-out through the equipment compartment, the retractable sensor system 150 may be mounted in a switchgear cabinet at any desired and available location to rack in and rack out from any desired location that is easily accessible to a user. For example, the retractable sensor system may be mounted in the switchgear cabinet to rack in or out through any location of the switchgear cabinet, e.g., a side or top wall of the bus or cable compartment, through an access opening covered by an access panel.

The retractable sensor system 150 may also be mounted on any surface of any one of the compartments of a switchgear cabinet and at any desired orientation. For example, the orientation of the retractable sensor system 150 can be varied to avoid obstacles in the switchgear cabinet, such as oriented horizontally, vertically or otherwise in the switchgear cabinet.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A switchgear cabinet with optical arc fault detection capability, comprising:
   an equipment compartment;
   a cable compartment;
   a bus compartment arranged between the equipment and cable compartments; and
   a retractable sensor system comprising:
      an optical sensor for optically sensing arcing in the bus or cable compartment;
      a rack mounted in the bus compartment and having one end which extends toward a back end of the equipment compartment and the other end which is arranged in the bus or cable compartment; and
      a slider configured to retain the optical sensor, the slider movably engaged to the rack to slide in one direction toward a back of the bus or cable compartment to a racked-in position in which the optical sensor is located to sense arcing in the bus or cable compartment and to slide in an opposite direction toward a front of the equipment compartment to a racked-out position in which the optical sensor is drawn into the equipment compartment.

2. The switchgear cabinet of claim 1, wherein the slider is formed of a dielectric material.

3. The switchgear cabinet of claim 1, wherein the rack and the slider together form an enclosed conduit for housing the optical sensor and wires of the optical sensor.

4. The switchgear cabinet of claim 1, wherein the equipment compartment includes an access panel through which to access one end of the slider, and to move the slider to the racked-in or racked-out positions.

5. The switchgear cabinet of claim 1, wherein the optical sensor comprises a plurality of sensors including an optical sensor, the slider being configured to retain the plurality of sensors at different locations along a length of the slider.

6. The switchgear cabinet of claim 1, wherein the slider includes a front end and a back end, the front end including a handle for moving the slider to the racked-in or racked-out positions.

7. The switchgear cabinet of claim 6, wherein the handle of the slider is configured as a stop to prevent the front end from sliding completely into the rack when the slider is being moved to the racked-in position.

8. The switchgear cabinet of claim 1, wherein the rack includes a front end and a back end and two opposing grooves between which the slider is movably engaged, one of the opposing grooves including a stop at a back end of the rack to prevent further movement of the slider when the slider is moved to the racked-in position.

9. The switchgear cabinet of claim 1, wherein the rack comprises a housing including:
   a top wall;
   a side wall;
   a bottom wall;
   an open side opposite the side wall; and
   a pair of opposing grooves, one of the opposing grooves positioned on the top wall and the other of the opposing grooves positioned on the bottom wall, the pair of opposing grooves extending along a length of the housing, the slider movably engaged between the opposing grooves of the rack to slide between the racked-in position and the racked-out position.

10. The switchgear cabinet of claim 1, wherein the retractable sensor system further comprises a bracket for mounting the rack onto a wall of the bus or cable compartment.

11. The switchgear cabinet of claim 10, wherein the bracket comprises a plurality of brackets, the rack being pivotally engaged to one of the plurality of brackets.

12. A retractable sensor system for an electrical enclosure having a user accessible area and an inaccessible area, comprising: a rack mountable in the inaccessible area of the electrical enclosure; and a slider configured to retain a plurality of sensors, the slider movably engaged to the rack to slide in one direction to a racked-in position in which the sensors are located to sense conditions in the electrical enclosure and to slide in an opposite direction to a racked-out position in which the sensors are drawn into the user accessible area of the enclosure, and wherein the electrical enclosure is a switchgear cabinet.

13. The system of claim 12, wherein the rack and the slider together form an enclosed conduit for housing the sensors and wires of the sensors.

14. The system of claim 12, wherein the rack comprises a housing including:
   a top wall;
   a side wall;
   a bottom wall;
   an open side opposite the side wall; and
   a pair of opposing grooves, one of the opposing grooves positioned on the top wall and the other of the opposing grooves positioned on the bottom wall, the pair of opposing grooves extending along a length of the housing, the slider movably engaged between the opposing grooves of the rack to slide between the racked-in position and the racked-out position.

15. The system of claim 12, wherein the rack is mountable in the electrical enclosure to extend adjacent to a wall of the inaccessible area of the electrical enclosure.

16. The system of claim 12, wherein the plurality of sensors are retained along a length of the slider, and housed in a conduit which is formed between the slider and the rack.

17. The system of claim 14, wherein the slider includes a plurality of openings or slots to mount and retain one or more sensors, the openings or slots facing the side wall of the rack when the slider is in the racked-in position.

* * * * *